(12) United States Patent
Ricordi

(10) Patent No.: US 9,281,530 B2
(45) Date of Patent: Mar. 8, 2016

(54) ADAPTER FOR CONNECTING A FUEL CELL AND A FUEL RESERVOIR FOR AN ELECTROPORTABLE DEVICE, A CELL AND ADAPTER ASSEMBLY AND THE DEVICE

(75) Inventor: Christian Ricordi, Bourg Les Valence (FR)

(73) Assignee: SOCIETE DE PROSPECTION ET D'INVENTIONS TECHNIQUES SPIT, Bourg-les-Valence (FR)

( * ) Notice: Subject to any disclaimer, the term of this patent is extended or adjusted under 35 U.S.C. 154(b) by 177 days.

(21) Appl. No.: 14/005,106

(22) PCT Filed: Mar. 15, 2012

(86) PCT No.: PCT/IB2012/051256
§ 371 (c)(1),
(2), (4) Date: Sep. 13, 2013

(87) PCT Pub. No.: WO2012/123917
PCT Pub. Date: Sep. 20, 2012

(65) Prior Publication Data
US 2014/0011117 A1 Jan. 9, 2014

(30) Foreign Application Priority Data
Mar. 16, 2011 (FR) ...................... 11 52149

(51) Int. Cl.
*H01M 8/04* (2006.01)
(52) U.S. Cl.
CPC ...... *H01M 8/04201* (2013.01); *H01M 2250/30* (2013.01); *Y02B 90/18* (2013.01); *Y02E 60/50* (2013.01)

(58) Field of Classification Search
CPC ................. H01M 8/04201; H01M 2250/30; Y02B 90/18
See application file for complete search history.

(56) References Cited

U.S. PATENT DOCUMENTS

| 8,047,229 B2 * | 11/2011 | Adams et al. ............ 137/614.03 |
| 8,851,114 B2 * | 10/2014 | Adams et al. ............ 137/614.03 |
| 2004/0209142 A1 * | 10/2004 | Becerra et al. ................... 429/34 |
| 2005/0022883 A1 * | 2/2005 | Adams et al. ............ 137/614.03 |
| 2005/0116190 A1 * | 6/2005 | Adams et al. ................. 251/144 |
| 2007/0298306 A1 * | 12/2007 | Finkelshtain et al. .......... 429/34 |
| 2008/0057374 A1 * | 3/2008 | Kurosawa ....................... 429/34 |
| 2009/0197144 A1 * | 8/2009 | Tseng et al. .................... 429/34 |
| 2010/0186836 A1 | 7/2010 | Yoshihiro et al. |

FOREIGN PATENT DOCUMENTS

EP 1463137 A2 9/2004

OTHER PUBLICATIONS

Corresponding International Application No. PCT/IB2012/051256 Search Report and Written Opinion dated Jul. 9, 2012.

* cited by examiner

*Primary Examiner* — Stewart Fraser
(74) *Attorney, Agent, or Firm* — Hauptman Ham, LLP

(57) ABSTRACT

An assembly of a fuel cell for an electroportable device and of a connection adapter for connecting the fuel cell and a fuel reservoir, the adapter being arranged for receiving a member for supplying the cell and an ejection nosepiece of the reservoir, the adapter comprising a valve arranged for being actuated by the ejection nosepiece of the reservoir and switched from a plugging condition, before connection, to a fuel transmission condition, after connection.

Thanks to the invention, the fuel cell is permanently maintained under fuel supply.

19 Claims, 1 Drawing Sheet

ADAPTER FOR CONNECTING A FUEL CELL AND A FUEL RESERVOIR FOR AN ELECTROPORTABLE DEVICE, A CELL AND ADAPTER ASSEMBLY AND THE DEVICE

RELATED APPLICATIONS

The present application is a National Stage of International Application No. PCT/IB2012/051256 filed Mar. 15, 2012 and claims priority from, French Application No. 1152149 filed Mar. 16, 2011.

This invention relates to electroportable devices operating autonomously with an integrated electric power source for supplying the operating power of such devices and/or an auxiliary power for some of the components of such devices. More particularly, these are devices comprising, as a source of power, a fuel cell associated, via a supply pipe, with a fuel reservoir, the power of the cell being able to generate electricity for supplying a battery for operating such portable devices. Such electroportable devices include, more particularly, fastening and sealing devices such as screwing devices, staplers, nailers and other resin injecting devices, and drilling devices such as piercing tools, drillers, for instance.

When a fuel cell is disconnected from a reservoir for being replaced, the cell and the supply pipe are therefore no longer supplied with fuel and some air enters the cell or the pipe. These then require purging. Indeed, a fuel cell must be continuously supplied with fuel in order to avoid the draining of said cell, which would degrade its efficiency.

The problem this invention of the present application aims at solving is thus to permanently maintain a fuel cell supplied with fuel.

Thus, the invention of the present application first relates to an assembly of a fuel cell for an electroportable device and of a connection adapter for connecting the fuel cell and a fuel reservoir, the adapter being arranged for receiving a cell supplying member and a reservoir ejection nosepiece, the adapter comprising a valve arranged for being actuated by the reservoir ejection nosepiece and switched from a plugging condition before connection, to a fuel transmission condition, after connection, whereby the fuel cell is permanently maintained under fuel supply.

As the valve is actuated by the reservoir ejection nosepiece, if the reservoir is disconnected, the valve returns to its plugging condition and the cell thus remains in communication with a fuel path preventing any air from entering the cell. Then, it is no more necessary to purge it.

The actuation of the valve by the reservoir ejection nosepiece may be direct or indirect.

Preferably, the cell supplying member is a supply pipe.

Advantageously, the valve of the adapter comprises a ball pushed back against a seat by a spring.

This invention further relates to an electroportable device comprising the assembly of the invention, the fuel cell being the source of power of the device and the adapter being connected to the cell by the supplying member.

It is understood that the Applicant intends to claim an electroportable device comprising a fuel cell and the adapter, with or without a reservoir for supplying the cell with fuel, the fuel cell being whether connected or not to the adapter.

The invention will be better understood upon reading the following description, with reference to the appended file, wherein.

Figures 1, 2, 3:
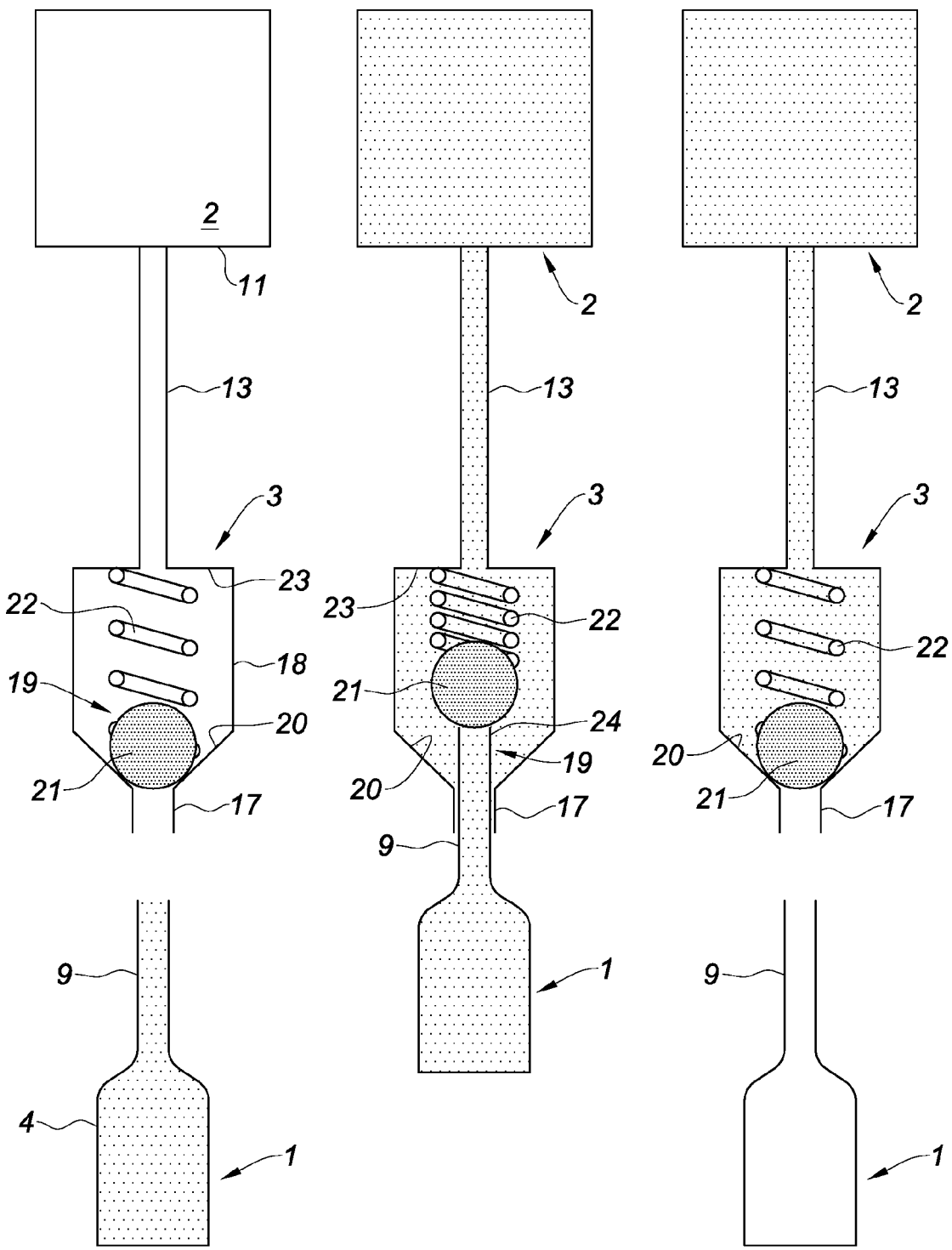
FIG. 1 is a very schematic axial sectional view of an assembly of a fuel cell of an electroportable device, an adapter for connection the cell to a fuel reservoir and a fuel reservoir, before the cell and the reservoir are connected.
FIG. 2 is a view of the assembly of FIG. 1, after the cell and the reservoir are connected.
FIG. 3 is a view of the assembly of FIG. 2 after disconnecting the reservoir from the cell.

The assembly that will be now and first described comprises a fuel reservoir 1, a fuel cell 2 and an adapter 3 for connecting them together.

The Reservoir

This is a container 4 extended with an ejection nosepiece 9. The ejection nosepiece 9 is a tubular member that may, for example, extend an internal pusher for closing the container 4 and that may thus be pushed back to the interior of the reservoir against the action of a return spring. All these members of the reservoir 1 are perfectly known to those skilled in the art;

The Fuel Cell

The fuel cell 2 conventionally comprises a container 11 to which a supply pipe 13 is connected.

The Adapter

This is a tubular body 18 receiving, on one side, the supply pipe 13 of the cell 2 and having, on the other side, a neck 17 forming a receiving nosepiece for receiving the ejection nosepiece 9 of the reservoir 1. On both sides, the tightness of the body 18, on the one hand, and the pipe 13 and the nosepiece 9, on the other hand, is provided by conventional means also known to those skilled in the art. The means may easily comprise O-rings seals.

On the fuel reservoir 1 side, the adapter is arranged as a valve 19 and has a frustoconical wall 20 acting as a seat for a ball 21 pushed back against this seat by a spring 22 extending between the ball and an abutment wall 23 of the body 18, on the side of the connecting area of the body 18 and the supply pipe 13 of the cell.

Operation

The adapter 3 and the supply pipe 13 of the fuel cell 2 may be first connected or the adapter 3 may be first mounted on the fuel reservoir 1.

Connecting the adapter 3 and the cell 2 occurs by means of the supply pipe 13.

Mounting the adapter 3 on the reservoir 1 occurs by sliding the ejection nosepiece 9 in the neck 17 of the adapter.

In the condition where the cell 2 is supplied with fuel from the reservoir 1, that is when fuel is transmitted from the reservoir 1 in the cell 2, as illustrated on FIG. 2, the end 24 of the reservoir ejection nosepiece 9 has here directly actuated the valve 19, pushing back the ball 21 against the action of the spring 22 being thus pressed against the wall 23, for disengaging the seat 20 from the valve 19, switching it therefore to a fuel transmission condition for supplying the fuel to the supply pipe 13 and the fuel cell 2.

The flow of the fuel out of the reservoir 1 may take place under the effect of gravity, by compressing the reservoir 1, notably.

When the reservoir 1 is empty and that it shall be changed, it is disconnected from the adapter 3 by removing it from the adapter. While disengaging from the valve 19, the reservoir ejection nosepiece 9, sliding out of the neck 17, allows the spring 22 of the adapter 3 to push the ball 21 back against its seat 20, a position wherein the valve 19 returns to its plugging condition (FIG. 3). In such a condition, the cell 2 remains in communication with a fuel path extending through the supply pipe 13 and the adapter 3. When a new reservoir is connected, there will be no need to purge the cell.

A ball valve has been described. Any part or other needle arranged so as to come in abutment against the seat 20 could also be appropriate.

It should be understood that, while using expression "fuel cell" in the instant specification, the applicant does not refer to what is commonly called "fuel canister".

The invention claimed is:

1. An assembly of a fuel cell for an electroportable device and of a connection adapter for connecting the fuel cell and a fuel reservoir, the adapter being arranged for receiving a member for supplying the cell and an ejection nosepiece of the reservoir, the adapter comprising a valve arranged for being actuated by the ejection nosepiece of the reservoir and switched from a plugging condition, before connection, to a fuel transmission condition, after connection, whereby the fuel cell is permanently maintained under fuel supply.

2. The assembly according to claim 1, having its valve being arranged so that the actuation thereof by the ejection nosepiece of the reservoir is direct.

3. The assembly according to claim 1, wherein the valve comprises a ball pushed back against a seat by a spring.

4. The assembly according to claim 1, wherein the member for supplying the cell is a supply pipe.

5. An electroportable device comprising an assembly according to claim 1, wherein the fuel cell is the source of power of the device and the connection adapter is connected to the cell by a supplying member.

6. The electroportable device according to claim 5, further comprising a fuel reservoir connected to the adapter for supplying the cell with fuel.

7. The electroportable device according to claim 1, wherein the adapter includes a body, wherein the adapter includes a plurality of O-ring seals, and wherein a tightness between the body and the member for supplying the cell is established by at least one of the O-ring seals and a tightness between the body and the ejection nosepiece is established by at least another of the O-ring seals.

8. The electroportable device according to claim 1, wherein the adapter includes a body, wherein the adapter is configured to establish a tightness between the body and the member for supplying the cell when the member for supplying the cell is received in the adapter.

9. The electroportable device according to claim 1, wherein the adapter is a tubular body configured to receive, on one side, the member for supplying the cell, and, on another side, the ejection nosepiece.

10. The electroportable device according to claim 1, wherein the adapter is a tubular body configured to receive, on one side, the member for supplying the cell, wherein the adapter further includes a neck forming a receiving nosepiece for receiving the ejection nosepiece on another side.

11. The electroportable device according to claim 1, wherein the adapter is configured such that, on two sides of the adapter, a tightness of the adapter, on the one hand, and the member for supplying the cell and the ejection nosepiece, on the other hand, is provided.

12. The electroportable device according to claim 1, wherein the adapter is configured such that, on two sides of the adapter, a tightness of the adapter, on the one hand, and the member for supplying the cell and the ejection nosepiece, on the other hand, is provided by conventional means.

13. The electroportable device according to claim 1, wherein the adapter is configured such that, on two sides of the adapter, a tightness of the adapter, on the one hand, and the member for supplying the cell and the ejection nosepiece, on the other hand, is provided by O-ring seals.

14. A method, comprising:
obtaining the adapter and the fuel cell and the ejection nosepiece of claim 1;
connecting the adapter and the member for supplying the cell; and
connecting the adapter and the ejection nosepiece, thereby maintaining the fuel cell under fuel supply.

15. The method of claim 14, wherein:
the action of connecting the adapter and the member for supplying the cell is executed before the action of connecting the adapter and the ejection nosepiece.

16. A method, comprising:
obtaining a fuel cell for an electroportable device, the fuel cell including a member for supplying the cell;
obtaining a fuel reservoir, the fuel reservoir, the fuel reservoir including an ejection nosepiece;
obtaining a connection adapter for connecting the fuel cell and the fuel reservoir the adapter being arranged for receiving the member for supplying the cell and the ejection nosepiece of the reservoir, the adapter comprising a valve arranged for being actuated by the ejection nosepiece of the reservoir and switched from a plugging condition, before connection, to a fuel transmission condition, after connection, whereby the fuel cell is permanently maintained under fuel supply;
placing the member for supplying the cell into connection with the adapter; and
placing the ejection nosepiece into connection with the adapter, thereby
providing fuel supply from the fuel reservoir to the fuel cell.

17. The method of claim 16, wherein:
the action of placing the member for supplying the cell into connection with the adapter is executed before the action of placing the ejection nosepiece into communication with the adapter.

18. The method of claim 16, wherein:
the action of placing the ejection nosepiece into communication with the adapter is executed before the action of placing the member for supplying the cell into connection with the adapter.

19. The electroportable device according to claim 1, wherein the adapter includes a body, wherein the adapter includes a plurality of O-ring seals, and wherein an interface between the body and the member for supplying the cell is established by at least one of the O-ring seals and an interface between the body and the ejection nosepiece is established by at least another of the O-ring seals.

* * * * *